United States Patent [19]

Schwartz

[11] Patent Number: 4,805,208
[45] Date of Patent: Feb. 14, 1989

[54] MODEM COMPRESSION SYSTEM FOR TELEPHONE NETWORK

[75] Inventor: Nira Schwartz, Doar Yehud, Israel
[73] Assignee: Niravoice, Inc., Milpitas, Calif.
[21] Appl. No.: 144,476
[22] Filed: Jan. 15, 1988
[51] Int. Cl.[4] .......................................... H04M 11/06
[52] U.S. Cl. ..................................................... 379/93
[58] Field of Search ............................ 379/93, 97, 94; 375/122, 52, 53

[56] References Cited

U.S. PATENT DOCUMENTS

4,330,886  5/1982  Fukuda et al. ........................ 379/93

Primary Examiner—Stafford D. Schreyer
Attorney, Agent, or Firm—Cushman, Darby & Cushman

[57] ABSTRACT

Bit compression system for a telephone modem utilizing differential phase shift modulation of a low-frequency tone carrier to transmit dibit or tribit values. Instead of transmitting digitized samples of the tone carrier over a conventional T1 telephone network, the modem compression system tribit extracts the dibit or values from digitized samples of the tone carrier, and transmits assembled T1 data bytes in a data stream containing solely the data bits encoded by the modem. At the receiving end, a modem decompressor reconstructs the digitized samples of the tone carrier using the dibit or tribit values. The T1 telephone network then uses the reconstructed digitized samples to reproduce the analog tone carrier for the receiving modem. The modem compressing system also includes AGC circuit for normalizing the levels of the T1 data samples and a modem/voice data detector for alternately routing the T1 data samples to respective speech and modem compressors.

10 Claims, 10 Drawing Sheets

−CONTINUATION OF 3A

| A | B | C | D | E | F | G | H |
|---|---|---|---|---|---|---|---|
| 128 | 8031. | 90. | 2 | 171 | 1279. | 171. | 1 |
| 129 | 7775. | 75. | 2 | 150 | 3231. | 156. | 1 |
| 130 | 7519. | 69. | 2 | 144 | 3999. | 150. | 1 |
| 131 | 7263. | 65. | 2 | 142 | 4447. | 146. | 1 |
| 132 | 7007. | 61. | 2 | 140 | 4959. | 142. | 1 |
| 133 | 6751. | 57. | 2 | 138 | 5471. | 138. | 1 |
| 134 | 6495. | 54. | 2 | 137 | 5727. | 135. | 1 |
| 135 | 6239. | 51. | 2 | 136 | 5983. | 132. | 1 |
| 136 | 5983. | 48. | 2 | 135 | 6239. | 129. | 1 |
| 137 | 5727. | 45. | 2 | 134 | 6495. | 126. | 1 |
| 138 | 5471. | 43. | 2 | 133 | 6751. | 124. | 1 |
| 139 | 5215. | 40. | 2 | 133 | 6751. | 121. | 1 |
| 140 | 4959. | 38. | 2 | 132 | 7007. | 119. | 1 |
| 141 | 4703. | 36. | 2 | 131 | 7263. | 117. | 1 |
| 142 | 4447. | 34. | 2 | 131 | 7263. | 115. | 1 |
| 143 | 4191. | 31. | 2 | 130 | 7519. | 112. | 1 |
| 144 | 3999. | 30. | 2 | 130 | 7519. | 111. | 1 |
| 145 | 3871. | 29. | 2 | 130 | 7519. | 110. | 1 |
| 146 | 3743. | 28. | 2 | 130 | 7519. | 109. | 1 |
| 147 | 3615. | 27. | 2 | 129 | 7775. | 108. | 1 |
| 148 | 3487. | 26. | 2 | 129 | 7775. | 107. | 1 |
| 149 | 3359. | 25. | 2 | 129 | 7775. | 106. | 1 |
| 150 | 3231. | 24. | 2 | 129 | 7775. | 105. | 1 |
| 151 | 3103. | 23. | 2 | 129 | 7775. | 104. | 1 |
| 152 | 2975. | 22. | 2 | 129 | 7775. | 103. | 1 |
| 153 | 2847. | 21. | 2 | 129 | 7775. | 102. | 1 |
| 154 | 2719. | 20. | 2 | 129 | 7775. | 101. | 1 |
| 155 | 2591. | 19. | 2 | 128 | 8031. | 100. | 1 |
| 156 | 2463. | 18. | 2 | 128 | 8031. | 99. | 1 |
| 157 | 2335. | 17. | 2 | 128 | 8031. | 98. | 1 |
| 158 | 2207. | 16. | 2 | 128 | 8031. | 97. | 1 |
| 159 | 2079. | 15. | 2 | 128 | 8031. | 96. | 1 |
| 160 | 1983. | 14. | 2 | 128 | 8031. | 95. | 1 |
| 161 | 1919. | 14. | 2 | 128 | 8031. | 95. | 1 |
| 162 | 1855. | 13. | 2 | 128 | 8031. | 94. | 1 |
| 163 | 1791. | 13. | 2 | 128 | 8031. | 94. | 1 |
| 164 | 1727. | 12. | 2 | 128 | 8031. | 93. | 1 |
| 165 | 1663. | 12. | 2 | 128 | 8031. | 93. | 1 |
| 166 | 1599. | 11. | 2 | 128 | 8031. | 92. | 1 |
| 167 | 1535. | 11. | 2 | 128 | 8031. | 92. | 1 |
| 168 | 1471. | 11. | 2 | 128 | 8031. | 92. | 1 |
| 169 | 1407. | 10. | 2 | 128 | 8031. | 91. | 1 |
| 170 | 1343. | 10. | 2 | 128 | 8031. | 91. | 1 |
| 171 | 1279. | 9. | 2 | 128 | 8031. | 90. | 1 |
| 172 | 1215. | 9. | 2 | 128 | 8031. | 90. | 2 |
| 173 | 1151. | 8. | 2 | 128 | 8031. | 89. | 2 |
| 174 | 1087. | 8. | 2 | 128 | 8031. | 89. | 2 |
| 175 | 1023. | 7. | 2 | 128 | 8031. | 88. | 2 |
| 176 | 975. | 7. | 2 | 128 | 8031. | 88. | 2 |
| 177 | 943. | 7. | 2 | 128 | 8031. | 88. | 2 |
| 178 | 911. | 7. | 2 | 128 | 8031. | 88. | 2 |
| 179 | 879. | 6. | 2 | 128 | 8031. | 87. | 2 |
| 180 | 847. | 6. | 2 | 128 | 8031. | 87. | 2 |
| 181 | 815. | 6. | 2 | 128 | 8031. | 87. | 2 |
| 182 | 783. | 6. | 2 | 128 | 8031. | 87. | 2 |
| 183 | 751. | 5. | 2 | 128 | 8031. | 86. | 2 |
| 184 | 719. | 5. | 2 | 128 | 8031. | 86. | 2 |
| 185 | 687. | 5. | 2 | 128 | 8031. | 86. | 2 |
| 186 | 655. | 5. | 2 | 128 | 8031. | 86. | 2 |
| 187 | 623. | 4. | 2 | 128 | 8031. | 85. | 2 |
| 188 | 591. | 4. | 2 | 128 | 8031. | 85. | 2 |
| 189 | 559. | 4. | 2 | 128 | 8031. | 85. | 2 |
| 190 | 527. | 4. | 2 | 128 | 8031. | 85. | 2 |
| 191 | 495. | 4. | 2 | 128 | 8031. | 85. | 2 |
| 192 | 471. | 3. | 2 | 128 | 8031. | 84. | 2 |
| 193 | 455. | 3. | 2 | 128 | 8031. | 84. | 2 |
| 194 | 439. | 3. | 2 | 128 | 8031. | 84. | 2 |
| 195 | 423. | 3. | 2 | 128 | 8031. | 84. | 2 |
| 196 | 407. | 3. | 2 | 128 | 8031. | 84. | 2 |
| 197 | 391. | 3. | 2 | 128 | 8031. | 84. | 2 |
| 198 | 375. | 3. | 2 | 128 | 8031. | 84. | 2 |
| 199 | 359. | 3. | 2 | 128 | 8031. | 84. | 2 |
| 200 | 343. | 2. | 2 | 128 | 8031. | 83. | 2 |
| 201 | 327. | 2. | 2 | 128 | 8031. | 83. | 2 |
| 202 | 311. | 2. | 2 | 128 | 8031. | 83. | 2 |
| 203 | 295. | 2. | 2 | 128 | 8031. | 83. | 2 |
| 204 | 279. | 2. | 2 | 128 | 8031. | 83. | 2 |
| 205 | 263. | 2. | 2 | 128 | 8031. | 83. | 2 |
| 206 | 247. | 2. | 2 | 128 | 8031. | 83. | 2 |
| 207 | 231. | 2. | 2 | 128 | 8031. | 83. | 2 |
| 208 | 219. | 2. | 2 | 128 | 8031. | 83. | 2 |
| 209 | 211. | 2. | 2 | 128 | 8031. | 83. | 2 |
| 210 | 203. | 1. | 2 | 128 | 8031. | 82. | 2 |
| 211 | 195. | 1. | 2 | 128 | 8031. | 82. | 2 |
| 212 | 187. | 1. | 2 | 128 | 8031. | 82. | 2 |
| 213 | 179. | 1. | 2 | 128 | 8031. | 82. | 2 |
| 214 | 171. | 1. | 2 | 128 | 8031. | 82. | 2 |
| 215 | 163. | 1. | 2 | 128 | 8031. | 82. | 2 |
| 216 | 155. | 1. | 2 | 128 | 8031. | 82. | 2 |
| 217 | 147. | 1. | 2 | 128 | 8031. | 82. | 2 |
| 218 | 139. | 1. | 2 | 128 | 8031. | 82. | 2 |
| 219 | 131. | 1. | 2 | 128 | 8031. | 82. | 2 |
| 220 | 123. | 1. | 2 | 128 | 8031. | 82. | 2 |
| 221 | 115. | 1. | 2 | 128 | 8031. | 82. | 2 |
| 222 | 107. | 1. | 2 | 128 | 8031. | 82. | 2 |
| 223 | 99. | 1. | 2 | 128 | 8031. | 82. | 2 |
| 224 | 93. | 1. | 2 | 128 | 8031. | 82. | 2 |
| 225 | 89. | 1. | 2 | 128 | 8031. | 82. | 2 |
| 226 | 85. | 1. | 2 | 128 | 8031. | 82. | 2 |
| 227 | 81. | 1. | 2 | 128 | 8031. | 82. | 2 |
| 228 | 77. | 1. | 2 | 128 | 8031. | 82. | 2 |
| 229 | 73. | 1. | 2 | 128 | 8031. | 82. | 2 |
| 230 | 69. | 0. | 2 | 128 | 8031. | 81. | 2 |
| 231 | 65. | 0. | 2 | 128 | 8031. | 81. | 2 |
| 232 | 61. | 0. | 2 | 128 | 8031. | 81. | 2 |
| 233 | 57. | 0. | 2 | 128 | 8031. | 81. | 2 |
| 234 | 53. | 0. | 2 | 128 | 8031. | 81. | 2 |
| 235 | 49. | 0. | 2 | 128 | 8031. | 81. | 2 |
| 236 | 45. | 0. | 2 | 128 | 8031. | 81. | 2 |
| 237 | 41. | 0. | 2 | 128 | 8031. | 81. | 2 |
| 238 | 37. | 0. | 2 | 128 | 8031. | 81. | 2 |
| 239 | 33. | 0. | 2 | 128 | 8031. | 81. | 2 |
| 240 | 30. | 0. | 2 | 128 | 8031. | 81. | 2 |
| 241 | 28. | 0. | 2 | 128 | 8031. | 81. | 2 |
| 242 | 26. | 0. | 2 | 128 | 8031. | 81. | 2 |
| 243 | 24. | 0. | 2 | 128 | 8031. | 81. | 2 |
| 244 | 22. | 0. | 2 | 128 | 8031. | 81. | 2 |
| 245 | 20. | 0. | 2 | 128 | 8031. | 81. | 2 |
| 246 | 18. | 0. | 2 | 128 | 8031. | 81. | 2 |
| 247 | 16. | 0. | 2 | 128 | 8031. | 81. | 2 |
| 248 | 14. | 0. | 2 | 128 | 8031. | 81. | 2 |
| 249 | 12. | 0. | 2 | 128 | 8031. | 81. | 2 |
| 250 | 10. | 0. | 2 | 128 | 8031. | 81. | 2 |
| 251 | 8. | 0. | 2 | 128 | 8031. | 81. | 2 |
| 252 | 6. | 0. | 2 | 128 | 8031. | 81. | 2 |
| 253 | 4. | 0. | 2 | 128 | 8031. | 81. | 2 |
| 254 | 2. | 0. | 2 | 128 | 8031. | 81. | 2 |
| 255 | 0. | 0. | 2 | 128 | 8031. | 81. | 2 |

*Fig.3B*

| A | B | C | D | E | F | G | H |
|---|---|---|---|---|---|---|---|
| 128 | 8031. | 90. | 1 | 171 | 1279. | 171. | 1 |
| 129 | 7775. | 105. | 1 | 54 | -783. | 186. | 2 |
| 130 | 7519. | 111. | 1 | 38 | -1599. | 192. | 2 |
| 131 | 7263. | 115. | 1 | 30 | -2207. | 196. | 2 |
| 132 | 7007. | 119. | 1 | 26 | -2719. | 200. | 2 |
| 133 | 6751. | 123. | 1 | 22 | -3231. | 204. | 2 |
| 134 | 6495. | 126. | 1 | 19 | -3615. | 207. | 2 |
| 135 | 6239. | 129. | 1 | 16 | -3999. | 210. | 2 |
| 136 | 5983. | 132. | 1 | 14 | -4447. | 213. | 2 |
| 137 | 5727. | 135. | 1 | 13 | -4703. | 216. | 2 |
| 138 | 5471. | 137. | 1 | 12 | -4959. | 218. | 2 |
| 139 | 5215. | 140. | 1 | 11 | -5215. | 221. | 2 |
| 140 | 4959. | 142. | 1 | 10 | -5471. | 223. | 2 |
| 141 | 4703. | 144. | 1 | 9 | -5727. | 225. | 2 |
| 142 | 4447. | 146. | 1 | 8 | -5983. | 227. | 2 |
| 143 | 4191. | 149. | 1 | 8 | -5983. | 230. | 2 |
| 144 | 3999. | 150. | 1 | 7 | -6239. | 231. | 2 |
| 145 | 3871. | 151. | 1 | 7 | -6239. | 232. | 2 |
| 146 | 3743. | 152. | 1 | 6 | -6495. | 233. | 2 |
| 147 | 3615. | 153. | 1 | 6 | -6495. | 234. | 2 |
| 148 | 3487. | 154. | 1 | 6 | -6495. | 235. | 2 |
| 149 | 3359. | 155. | 1 | 5 | -6751. | 236. | 2 |
| 150 | 3231. | 156. | 1 | 5 | -6751. | 237. | 2 |
| 151 | 3103. | 157. | 1 | 5 | -6751. | 238. | 2 |
| 152 | 2975. | 158. | 1 | 4 | -7007. | 239. | 2 |
| 153 | 2847. | 159. | 1 | 4 | -7007. | 240. | 2 |
| 154 | 2719. | 160. | 1 | 4 | -7007. | 241. | 2 |
| 155 | 2591. | 161. | 1 | 4 | -7007. | 242. | 2 |
| 156 | 2463. | 162. | 1 | 3 | -7263. | 243. | 2 |
| 157 | 2335. | 163. | 1 | 3 | -7263. | 244. | 2 |
| 158 | 2207. | 164. | 1 | 3 | -7263. | 245. | 2 |
| 159 | 2079. | 165. | 1 | 3 | -7263. | 246. | 2 |
| 160 | 1983. | 166. | 1 | 3 | -7263. | 247. | 2 |
| 161 | 1919. | 166. | 1 | 2 | -7519. | 247. | 2 |
| 162 | 1855. | 167. | 1 | 2 | -7519. | 248. | 2 |
| 163 | 1791. | 167. | 1 | 2 | -7519. | 248. | 2 |
| 164 | 1727. | 168. | 1 | 2 | -7519. | 249. | 2 |
| 165 | 1663. | 168. | 1 | 2 | -7519. | 249. | 2 |
| 166 | 1599. | 169. | 1 | 2 | -7519. | 250. | 2 |
| 167 | 1535. | 169. | 1 | 2 | -7519. | 250. | 2 |
| 168 | 1471. | 169. | 1 | 2 | -7519. | 250. | 2 |
| 169 | 1407. | 170. | 1 | 2 | -7519. | 251. | 2 |
| 170 | 1343. | 170. | 1 | 2 | -7519. | 251. | 2 |
| 171 | 1279. | 171. | 1 | 2 | -7519. | 252. | 2 |
| 172 | 1215. | 171. | 1 | 1 | -7775. | 252. | 2 |
| 173 | 1151. | 172. | 1 | 1 | -7775. | 253. | 2 |
| 174 | 1087. | 172. | 1 | 1 | -7775. | 253. | 2 |
| 175 | 1023. | 173. | 1 | 1 | -7775. | 254. | 2 |
| 176 | 975. | 173. | 1 | 1 | -7775. | 254. | 2 |
| 177 | 943. | 173. | 1 | 1 | -7775. | 254. | 2 |
| 178 | 911. | 173. | 1 | 1 | -7775. | 254. | 2 |
| 179 | 879. | 174. | 1 | 1 | -7775. | 255. | 2 |
| 180 | 847. | 174. | 1 | 1 | -7775. | 255. | 2 |
| 181 | 815. | 174. | 1 | 1 | -7775. | 255. | 2 |
| 182 | 783. | 174. | 1 | 1 | -7775. | 255. | 2 |
| 183 | 751. | 175. | 1 | 1 | -7775. | 256. | 2 |
| 184 | 719. | 175. | 1 | 1 | -7775. | 256. | 2 |
| 185 | 687. | 175. | 1 | 1 | -7775. | 256. | 2 |
| 186 | 655. | 175. | 1 | 1 | -7775. | 256. | 2 |
| 187 | 623. | 176. | 1 | 1 | -7775. | 257. | 2 |
| 188 | 591. | 176. | 1 | 1 | -7775. | 257. | 2 |
| 189 | 559. | 176. | 1 | 1 | -7775. | 257. | 2 |
| 190 | 527. | 176. | 1 | 1 | -7775. | 257. | 2 |
| 191 | 495. | 176. | 1 | 1 | -7775. | 257. | 2 |

-CONTINUATION OF 3B

| A | B | C | D | E | F | G | H |
|---|---|---|---|---|---|---|---|
| 192 | 471. | 177. | 1 | 1 | -7775. | 258. | 2 |
| 193 | 455. | 177. | 1 | 1 | -7775. | 258. | 2 |
| 194 | 439. | 177. | 1 | 1 | -7775. | 258. | 2 |
| 195 | 423. | 177. | 1 | 1 | -7775. | 258. | 2 |
| 196 | 407. | 177. | 1 | 1 | -7775. | 258. | 2 |
| 197 | 391. | 177. | 1 | 1 | -7775. | 258. | 2 |
| 198 | 375. | 177. | 1 | 1 | -7775. | 258. | 2 |
| 199 | 359. | 177. | 1 | 1 | -7775. | 258. | 2 |
| 200 | 343. | 178. | 1 | 1 | -7775. | 259. | 2 |
| 201 | 327. | 178. | 1 | 1 | -7775. | 259. | 2 |
| 202 | 311. | 178. | 1 | 1 | -7775. | 259. | 2 |
| 203 | 295. | 178. | 1 | 1 | -7775. | 259. | 2 |
| 204 | 279. | 178. | 1 | 1 | -7775. | 259. | 2 |
| 205 | 263. | 178. | 1 | 1 | -7775. | 259. | 2 |
| 206 | 247. | 178. | 1 | 1 | -7775. | 259. | 2 |
| 207 | 231. | 178. | 1 | 1 | -7775. | 259. | 2 |
| 208 | 219. | 178. | 1 | 1 | -7775. | 259. | 2 |
| 209 | 211. | 178. | 1 | 1 | -7775. | 259. | 2 |
| 210 | 203. | 179. | 1 | 1 | -7775. | 260. | 2 |
| 211 | 195. | 179. | 1 | 1 | -7775. | 260. | 2 |
| 212 | 187. | 179. | 1 | 1 | -7775. | 260. | 2 |
| 213 | 179. | 179. | 1 | 1 | -7775. | 260. | 2 |
| 214 | 171. | 179. | 1 | 0 | -8031. | 260. | 2 |
| 215 | 163. | 179. | 1 | 0 | -8031. | 260. | 2 |
| 216 | 155. | 179. | 1 | 0 | -8031. | 260. | 2 |
| 217 | 147. | 179. | 1 | 0 | -8031. | 260. | 2 |
| 218 | 139. | 179. | 1 | 0 | -8031. | 260. | 2 |
| 219 | 131. | 179. | 1 | 0 | -8031. | 260. | 2 |
| 220 | 123. | 179. | 1 | 0 | -8031. | 260. | 2 |
| 221 | 115. | 179. | 1 | 0 | -8031. | 260. | 2 |
| 222 | 107. | 179. | 1 | 0 | -8031. | 260. | 2 |
| 223 | 99. | 179. | 1 | 0 | -8031. | 260. | 2 |
| 224 | 93. | 179. | 1 | 0 | -8031. | 260. | 2 |
| 225 | 89. | 179. | 1 | 0 | -8031. | 260. | 2 |
| 226 | 85. | 179. | 1 | 0 | -8031. | 260. | 2 |
| 227 | 81. | 179. | 1 | 0 | -8031. | 260. | 2 |
| 228 | 77. | 179. | 1 | 0 | -8031. | 260. | 2 |
| 229 | 73. | 179. | 1 | 0 | -8031. | 260. | 2 |
| 230 | 69. | 180. | 1 | 0 | -8031. | 261. | 2 |
| 231 | 65. | 180. | 1 | 0 | -8031. | 261. | 2 |
| 232 | 61. | 180. | 1 | 0 | -8031. | 261. | 2 |
| 233 | 57. | 180. | 1 | 0 | -8031. | 261. | 2 |
| 234 | 53. | 180. | 1 | 0 | -8031. | 261. | 2 |
| 235 | 49. | 180. | 1 | 0 | -8031. | 261. | 2 |
| 236 | 45. | 180. | 1 | 0 | -8031. | 261. | 2 |
| 237 | 41. | 180. | 1 | 0 | -8031. | 261. | 2 |
| 238 | 37. | 180. | 1 | 0 | -8031. | 261. | 2 |
| 239 | 33. | 180. | 1 | 0 | -8031. | 261. | 2 |
| 240 | 30. | 180. | 1 | 0 | -8031. | 261. | 2 |
| 241 | 28. | 180. | 1 | 0 | -8031. | 261. | 2 |
| 242 | 26. | 180. | 1 | 0 | -8031. | 261. | 2 |
| 243 | 24. | 180. | 1 | 0 | -8031. | 261. | 2 |
| 244 | 22. | 180. | 1 | 0 | -8031. | 261. | 2 |
| 245 | 20. | 180. | 1 | 0 | -8031. | 261. | 2 |
| 246 | 18. | 180. | 1 | 0 | -8031. | 261. | 2 |
| 247 | 16. | 180. | 1 | 0 | -8031. | 261. | 2 |
| 248 | 14. | 180. | 1 | 0 | -8031. | 261. | 2 |
| 249 | 12. | 180. | 1 | 0 | -8031. | 261. | 2 |
| 250 | 10. | 180. | 1 | 0 | -8031. | 261. | 2 |
| 251 | 8. | 180. | 1 | 0 | -8031. | 261. | 2 |
| 252 | 6. | 180. | 1 | 0 | -8031. | 261. | 2 |
| 253 | 4. | 180. | 1 | 0 | -8031. | 261. | 2 |
| 254 | 2. | 180. | 1 | 0 | -8031. | 261. | 2 |
| 255 | 0. | 180. | 1 | 0 | -8031. | 261. | 2 |

Fig 3c

-CONTINUATION OF 3C

| A | B | C | D | E | F | G | H |
|---|---|---|---|---|---|---|---|
| 0 | -8031. | 270. | 2 | 43 | -1279. | 351. | 1 |
| 1 | -7775. | 255. | 2 | 22 | -3231. | 336. | 1 |
| 2 | -7519. | 249. | 2 | 16 | -3999. | 330. | 1 |
| 3 | -7263. | 245. | 2 | 14 | -4447. | 326. | 1 |
| 4 | -7007. | 241. | 2 | 12 | -4959. | 322. | 1 |
| 5 | -6751. | 237. | 2 | 10 | -5471. | 318. | 1 |
| 6 | -6495. | 234. | 2 | 9 | -5727. | 315. | 1 |
| 7 | -6239. | 231. | 2 | 8 | -5983. | 312. | 1 |
| 8 | -5983. | 228. | 2 | 7 | -6239. | 309. | 1 |
| 9 | -5727. | 225. | 2 | 6 | -6495. | 306. | 1 |
| 10 | -5471. | 223. | 2 | 5 | -6751. | 304. | 1 |
| 11 | -5215. | 220. | 2 | 5 | -6751. | 301. | 1 |
| 12 | -4959. | 218. | 2 | 4 | -7007. | 299. | 1 |
| 13 | -4703. | 216. | 2 | 3 | -7263. | 297. | 1 |
| 14 | -4447. | 214. | 2 | 3 | -7263. | 295. | 1 |
| 15 | -4191. | 211. | 2 | 2 | -7519. | 292. | 1 |
| 16 | -3999. | 210. | 2 | 2 | -7519. | 291. | 1 |
| 17 | -3871. | 209. | 2 | 2 | -7519. | 290. | 1 |
| 18 | -3743. | 208. | 2 | 2 | -7519. | 289. | 1 |
| 19 | -3615. | 207. | 2 | 1 | -7775. | 288. | 1 |
| 20 | -3487. | 206. | 2 | 1 | -7775. | 287. | 1 |
| 21 | -3359. | 205. | 2 | 1 | -7775. | 286. | 1 |
| 22 | -3231. | 204. | 2 | 1 | -7775. | 285. | 1 |
| 23 | -3103. | 203. | 2 | 1 | -7775. | 284. | 1 |
| 24 | -2975. | 202. | 2 | 1 | -7775. | 283. | 1 |
| 25 | -2847. | 201. | 2 | 1 | -7775. | 282. | 1 |
| 26 | -2719. | 200. | 2 | 1 | -7775. | 281. | 1 |
| 27 | -2591. | 199. | 2 | 0 | -8031. | 280. | 1 |
| 28 | -2463. | 198. | 2 | 0 | -8031. | 279. | 1 |
| 29 | -2335. | 197. | 2 | 0 | -8031. | 278. | 1 |
| 30 | -2207. | 196. | 2 | 0 | -8031. | 277. | 1 |
| 31 | -2079. | 195. | 2 | 0 | -8031. | 276. | 1 |
| 32 | -1983. | 194. | 2 | 0 | -8031. | 275. | 1 |
| 33 | -1919. | 194. | 2 | 0 | -8031. | 275. | 1 |
| 34 | -1855. | 193. | 2 | 0 | -8031. | 274. | 1 |
| 35 | -1791. | 193. | 2 | 0 | -8031. | 274. | 1 |
| 36 | -1727. | 192. | 2 | 0 | -8031. | 273. | 1 |
| 37 | -1663. | 192. | 2 | 0 | -8031. | 273. | 1 |
| 38 | -1599. | 191. | 2 | 0 | -8031. | 272. | 1 |
| 39 | -1535. | 191. | 2 | 0 | -8031. | 272. | 1 |
| 40 | -1471. | 191. | 2 | 0 | -8031. | 272. | 1 |
| 41 | -1407. | 190. | 2 | 0 | -8031. | 271. | 1 |
| 42 | -1343. | 190. | 2 | 0 | -8031. | 271. | 1 |
| 43 | -1279. | 189. | 2 | 0 | -8031. | 270. | 1 |
| 44 | -1215. | 189. | 2 | 0 | -8031. | 270. | 2 |
| 45 | -1151. | 188. | 2 | 0 | -8031. | 269. | 2 |
| 46 | -1087. | 188. | 2 | 0 | -8031. | 269. | 2 |
| 47 | -1023. | 187. | 2 | 0 | -8031. | 268. | 2 |
| 48 | -975. | 187. | 2 | 0 | -8031. | 268. | 2 |
| 49 | -943. | 187. | 2 | 0 | -8031. | 268. | 2 |
| 50 | -911. | 187. | 2 | 0 | -8031. | 268. | 2 |
| 51 | -879. | 186. | 2 | 0 | -8031. | 267. | 2 |
| 52 | -847. | 186. | 2 | 0 | -8031. | 267. | 2 |
| 53 | -815. | 186. | 2 | 0 | -8031. | 267. | 2 |
| 54 | -783. | 186. | 2 | 0 | -8031. | 267. | 2 |
| 55 | -751. | 185. | 2 | 0 | -8031. | 266. | 2 |
| 56 | -719. | 185. | 2 | 0 | -8031. | 266. | 2 |
| 57 | -687. | 185. | 2 | 0 | -8031. | 266. | 2 |
| 58 | -655. | 185. | 2 | 0 | -8031. | 266. | 2 |
| 59 | -623. | 184. | 2 | 0 | -8031. | 265. | 2 |
| 60 | -591. | 184. | 2 | 0 | -8031. | 265. | 2 |
| 61 | -559. | 184. | 2 | 0 | -8031. | 265. | 2 |
| 62 | -527. | 184. | 2 | 0 | -8031. | 265. | 2 |
| 63 | -495. | 184. | 2 | 0 | -8031. | 265. | 2 |
| 64 | -471. | 183. | 2 | 0 | -8031. | 264. | 2 |
| 65 | -455. | 183. | 2 | 0 | -8031. | 264. | 2 |
| 66 | -439. | 183. | 2 | 0 | -8031. | 264. | 2 |
| 67 | -423. | 183. | 2 | 0 | -8031. | 264. | 2 |
| 68 | -407. | 183. | 2 | 0 | -8031. | 264. | 2 |
| 69 | -391. | 183. | 2 | 0 | -8031. | 264. | 2 |
| 70 | -375. | 183. | 2 | 0 | -8031. | 264. | 2 |
| 71 | -359. | 183. | 2 | 0 | -8031. | 264. | 2 |
| 72 | -343. | 182. | 2 | 0 | -8031. | 263. | 2 |
| 73 | -327. | 182. | 2 | 0 | -8031. | 263. | 2 |
| 74 | -311. | 182. | 2 | 0 | -8031. | 263. | 2 |
| 75 | -295. | 182. | 2 | 0 | -8031. | 263. | 2 |
| 76 | -279. | 182. | 2 | 0 | -8031. | 263. | 2 |
| 77 | -263. | 182. | 2 | 0 | -8031. | 263. | 2 |
| 78 | -247. | 182. | 2 | 0 | -8031. | 263. | 2 |
| 79 | -231. | 182. | 2 | 0 | -8031. | 263. | 2 |
| 80 | -219. | 182. | 2 | 0 | -8031. | 263. | 2 |
| 81 | -211. | 182. | 2 | 0 | -8031. | 263. | 2 |
| 82 | -203. | 181. | 2 | 0 | -8031. | 262. | 2 |
| 83 | -195. | 181. | 2 | 0 | -8031. | 262. | 2 |
| 84 | -187. | 181. | 2 | 0 | -8031. | 262. | 2 |
| 85 | -179. | 181. | 2 | 0 | -8031. | 262. | 2 |
| 86 | -171. | 181. | 2 | 0 | -8031. | 262. | 2 |
| 87 | -163. | 181. | 2 | 0 | -8031. | 262. | 2 |
| 88 | -155. | 181. | 2 | 0 | -8031. | 262. | 2 |
| 89 | -147. | 181. | 2 | 0 | -8031. | 262. | 2 |
| 90 | -139. | 181. | 2 | 0 | -8031. | 262. | 2 |
| 91 | -131. | 181. | 2 | 0 | -8031. | 262. | 2 |
| 92 | -123. | 181. | 2 | 0 | -8031. | 262. | 2 |
| 93 | -115. | 181. | 2 | 0 | -8031. | 262. | 2 |
| 94 | -107. | 181. | 2 | 0 | -8031. | 262. | 2 |
| 95 | -99. | 181. | 2 | 0 | -8031. | 262. | 2 |
| 96 | -93. | 181. | 2 | 0 | -8031. | 262. | 2 |
| 97 | -89. | 181. | 2 | 0 | -8031. | 262. | 2 |
| 98 | -85. | 181. | 2 | 0 | -8031. | 262. | 2 |
| 99 | -81. | 181. | 2 | 0 | -8031. | 262. | 2 |
| 100 | -77. | 181. | 2 | 0 | -8031. | 262. | 2 |
| 101 | -73. | 181. | 2 | 0 | -8031. | 262. | 2 |
| 102 | -69. | 180. | 2 | 0 | -8031. | 261. | 2 |
| 103 | -65. | 180. | 2 | 0 | -8031. | 261. | 2 |
| 104 | -61. | 180. | 2 | 0 | -8031. | 261. | 2 |
| 105 | -57. | 180. | 2 | 0 | -8031. | 261. | 2 |
| 106 | -53. | 180. | 2 | 0 | -8031. | 261. | 2 |
| 107 | -49. | 180. | 2 | 0 | -8031. | 261. | 2 |
| 108 | -45. | 180. | 2 | 0 | -8031. | 261. | 2 |
| 109 | -41. | 180. | 2 | 0 | -8031. | 261. | 2 |
| 110 | -37. | 180. | 2 | 0 | -8031. | 261. | 2 |
| 111 | -33. | 180. | 2 | 0 | -8031. | 261. | 2 |
| 112 | -30. | 180. | 2 | 0 | -8031. | 261. | 2 |
| 113 | -28. | 180. | 2 | 0 | -8031. | 261. | 2 |
| 114 | -26. | 180. | 2 | 0 | -8031. | 261. | 2 |
| 115 | -24. | 180. | 2 | 0 | -8031. | 261. | 2 |
| 116 | -22. | 180. | 2 | 0 | -8031. | 261. | 2 |
| 117 | -20. | 180. | 2 | 0 | -8031. | 261. | 2 |
| 118 | -18. | 180. | 2 | 0 | -8031. | 261. | 2 |
| 119 | -16. | 180. | 2 | 0 | -8031. | 261. | 2 |
| 120 | -14. | 180. | 2 | 0 | -8031. | 261. | 2 |
| 121 | -12. | 180. | 2 | 0 | -8031. | 261. | 2 |
| 122 | -10. | 180. | 2 | 0 | -8031. | 261. | 2 |
| 123 | -8. | 180. | 2 | 0 | -8031. | 261. | 2 |
| 124 | -6. | 180. | 2 | 0 | -8031. | 261. | 2 |
| 125 | -4. | 180. | 2 | 0 | -8031. | 261. | 2 |
| 126 | -2. | 180. | 2 | 0 | -8031. | 261. | 2 |
| 127 | 0. | 180. | 2 | 0 | -8031. | 261. | 2 |

Fig.3D

| A | B | C | D | E | F | G | H | A | B | C | D | E | F | G | H |
|---|---|---|---|---|---|---|---|---|---|---|---|---|---|---|---|
| 0 | -8031. | 270. | 1 |  |  |  |  | 43 | -1279. | 351. | 1 |  |  |  |  |
| 1 | -7775. | 285. | 1 | 182 | 783. | 6. | 2 | 64 | -471. | 357. | 1 | 129 | 7775. | 78. | 2 |
| 2 | -7519. | 291. | 1 | 166 | 1599. | 12. | 2 | 65 | -455. | 357. | 1 | 129 | 7775. | 78. | 2 |
| 3 | -7263. | 295. | 1 | 158 | 2207. | 16. | 2 | 66 | -439. | 357. | 1 | 129 | 7775. | 78. | 2 |
| 4 | -7007. | 299. | 1 | 154 | 2719. | 20. | 2 | 67 | -423. | 357. | 1 | 129 | 7775. | 78. | 2 |
| 5 | -6751. | 303. | 1 | 150 | 3231. | 24. | 2 | 68 | -407. | 357. | 1 | 129 | 7775. | 78. | 2 |
| 6 | -6495. | 306. | 1 | 147 | 3615. | 27. | 2 | 69 | -391. | 357. | 1 | 129 | 7775. | 78. | 2 |
| 7 | -6239. | 309. | 1 | 144 | 3999. | 30. | 2 | 70 | -375. | 357. | 1 | 129 | 7775. | 78. | 2 |
| 8 | -5983. | 312. | 1 | 142 | 4447. | 33. | 2 | 71 | -359. | 357. | 1 | 129 | 7775. | 78. | 2 |
| 9 | -5727. | 315. | 1 | 141 | 4703. | 36. | 2 | 72 | -343. | 358. | 1 | 129 | 7775. | 79. | 2 |
| 10 | -5471. | 317. | 1 | 140 | 4959. | 38. | 2 | 73 | -327. | 358. | 1 | 129 | 7775. | 79. | 2 |
| 11 | -5215. | 320. | 1 | 139 | 5215. | 41. | 2 | 74 | -311. | 358. | 1 | 129 | 7775. | 79. | 2 |
| 12 | -4959. | 322. | 1 | 138 | 5471. | 43. | 2 | 75 | -295. | 358. | 1 | 129 | 7775. | 79. | 2 |
| 13 | -4703. | 324. | 1 | 137 | 5727. | 45. | 2 | 76 | -279. | 358. | 1 | 129 | 7775. | 79. | 2 |
| 14 | -4447. | 326. | 1 | 136 | 5983. | 47. | 2 | 77 | -263. | 358. | 1 | 129 | 7775. | 79. | 2 |
| 15 | -4191. | 329. | 1 | 136 | 5983. | 50. | 2 | 78 | -247. | 358. | 1 | 129 | 7775. | 79. | 2 |
| 16 | -3999. | 330. | 1 | 135 | 6239. | 51. | 2 | 79 | -231. | 358. | 1 | 129 | 7775. | 79. | 2 |
| 17 | -3871. | 331. | 1 | 135 | 6239. | 52. | 2 | 80 | -219. | 358. | 1 | 129 | 7775. | 79. | 2 |
| 18 | -3743. | 332. | 1 | 134 | 6495. | 53. | 2 | 81 | -211. | 358. | 1 | 129 | 7775. | 79. | 2 |
| 19 | -3615. | 333. | 1 | 134 | 6495. | 54. | 2 | 82 | -203. | 359. | 1 | 129 | 7775. | 80. | 2 |
| 20 | -3487. | 334. | 1 | 134 | 6495. | 55. | 2 | 83 | -195. | 359. | 1 | 129 | 7775. | 80. | 2 |
| 21 | -3359. | 335. | 1 | 133 | 6751. | 56. | 2 | 84 | -187. | 359. | 1 | 129 | 7775. | 80. | 2 |
| 22 | -3231. | 336. | 1 | 133 | 6751. | 57. | 2 | 85 | -179. | 359. | 1 | 129 | 7775. | 80. | 2 |
| 23 | -3103. | 337. | 1 | 133 | 6751. | 58. | 2 | 86 | -171. | 359. | 1 | 128 | 8031. | 80. | 2 |
| 24 | -2975. | 338. | 1 | 132 | 7007. | 59. | 2 | 87 | -163. | 359. | 1 | 128 | 8031. | 80. | 2 |
| 25 | -2847. | 339. | 1 | 132 | 7007. | 60. | 2 | 88 | -155. | 359. | 1 | 128 | 8031. | 80. | 2 |
| 26 | -2719. | 340. | 1 | 132 | 7007. | 61. | 2 | 89 | -147. | 359. | 1 | 128 | 8031. | 80. | 2 |
| 27 | -2591. | 341. | 1 | 132 | 7007. | 62. | 2 | 90 | -139. | 359. | 1 | 128 | 8031. | 80. | 2 |
| 28 | -2463. | 342. | 1 | 131 | 7263. | 63. | 2 | 91 | -131. | 359. | 1 | 128 | 8031. | 80. | 2 |
| 29 | -2335. | 343. | 1 | 131 | 7263. | 64. | 2 | 92 | -123. | 359. | 1 | 128 | 8031. | 80. | 2 |
| 30 | -2207. | 344. | 1 | 131 | 7263. | 65. | 2 | 93 | -115. | 359. | 1 | 128 | 8031. | 80. | 2 |
| 31 | -2079. | 345. | 1 | 131 | 7263. | 66. | 2 | 94 | -107. | 359. | 1 | 128 | 8031. | 80. | 2 |
| 32 | -1983. | 346. | 1 | 131 | 7263. | 67. | 2 | 95 | -99. | 359. | 1 | 128 | 8031. | 80. | 2 |
| 33 | -1919. | 346. | 1 | 130 | 7519. | 67. | 2 | 96 | -93. | 359. | 1 | 128 | 8031. | 80. | 2 |
| 34 | -1855. | 347. | 1 | 130 | 7519. | 68. | 2 | 97 | -89. | 359. | 1 | 128 | 8031. | 80. | 2 |
| 35 | -1791. | 347. | 1 | 130 | 7519. | 68. | 2 | 98 | -85. | 359. | 1 | 128 | 8031. | 80. | 2 |
| 36 | -1727. | 348. | 1 | 130 | 7519. | 69. | 2 | 99 | -81. | 359. | 1 | 128 | 8031. | 80. | 2 |
| 37 | -1663. | 348. | 1 | 130 | 7519. | 69. | 2 | 100 | -77. | 359. | 1 | 128 | 8031. | 80. | 2 |
| 38 | -1599. | 349. | 1 | 130 | 7519. | 70. | 2 | 101 | -73. | 359. | 1 | 128 | 8031. | 80. | 2 |
| 39 | -1535. | 349. | 1 | 130 | 7519. | 70. | 2 | 102 | -69. | 360. | 1 | 128 | 8031. | 81. | 2 |
| 40 | -1471. | 349. | 1 | 130 | 7519. | 70. | 2 | 103 | -65. | 360. | 1 | 128 | 8031. | 81. | 2 |
| 41 | -1407. | 350. | 1 | 130 | 7519. | 71. | 2 | 104 | -61. | 360. | 1 | 128 | 8031. | 81. | 2 |
| 42 | -1343. | 350. | 1 | 130 | 7519. | 71. | 2 | 105 | -57. | 360. | 1 | 128 | 8031. | 81. | 2 |
| 43 | -1279. | 351. | 1 | 130 | 7519. | 72. | 2 | 106 | -53. | 360. | 1 | 128 | 8031. | 81. | 2 |
| 44 | -1215. | 351. | 1 | 129 | 7775. | 72. | 2 | 107 | -49. | 360. | 1 | 128 | 8031. | 81. | 2 |
| 45 | -1151. | 352. | 1 | 129 | 7775. | 73. | 2 | 108 | -45. | 360. | 1 | 128 | 8031. | 81. | 2 |
| 46 | -1087. | 352. | 1 | 129 | 7775. | 73. | 2 | 109 | -41. | 360. | 1 | 128 | 8031. | 81. | 2 |
| 47 | -1023. | 353. | 1 | 129 | 7775. | 74. | 2 | 110 | -37. | 360. | 1 | 128 | 8031. | 81. | 2 |
| 48 | -975. | 353. | 1 | 129 | 7775. | 74. | 2 | 111 | -33. | 360. | 1 | 128 | 8031. | 81. | 2 |
| 49 | -943. | 353. | 1 | 129 | 7775. | 74. | 2 | 112 | -30. | 360. | 1 | 128 | 8031. | 81. | 2 |
| 50 | -911. | 353. | 1 | 129 | 7775. | 74. | 2 | 113 | -28. | 360. | 1 | 128 | 8031. | 81. | 2 |
| 51 | -879. | 354. | 1 | 129 | 7775. | 75. | 2 | 114 | -26. | 360. | 1 | 128 | 8031. | 81. | 2 |
| 52 | -847. | 354. | 1 | 129 | 7775. | 75. | 2 | 115 | -24. | 360. | 1 | 128 | 8031. | 81. | 2 |
| 53 | -815. | 354. | 1 | 129 | 7775. | 75. | 2 | 116 | -22. | 360. | 1 | 128 | 8031. | 81. | 2 |
| 54 | -783. | 354. | 1 | 129 | 7775. | 75. | 2 | 117 | -20. | 360. | 1 | 128 | 8031. | 81. | 2 |
| 55 | -751. | 355. | 1 | 129 | 7775. | 76. | 2 | 118 | -18. | 360. | 1 | 128 | 8031. | 81. | 2 |
| 56 | -719. | 355. | 1 | 129 | 7775. | 76. | 2 | 119 | -16. | 360. | 1 | 128 | 8031. | 81. | 2 |
| 57 | -687. | 355. | 1 | 129 | 7775. | 76. | 2 | 120 | -14. | 360. | 1 | 128 | 8031. | 81. | 2 |
| 58 | -655. | 355. | 1 | 129 | 7775. | 76. | 2 | 121 | -12. | 360. | 1 | 128 | 8031. | 81. | 2 |
| 59 | -623. | 356. | 1 | 129 | 7775. | 77. | 2 | 122 | -10. | 360. | 1 | 128 | 8031. | 81. | 2 |
| 60 | -591. | 356. | 1 | 129 | 7775. | 77. | 2 | 123 | -8. | 360. | 1 | 128 | 8031. | 81. | 2 |
| 61 | -559. | 356. | 1 | 129 | 7775. | 77. | 2 | 124 | -6. | 360. | 1 | 128 | 8031. | 81. | 2 |
| 62 | -527. | 356. | 1 | 129 | 7775. | 77. | 2 | 125 | -4. | 360. | 1 | 128 | 8031. | 81. | 2 |
| 63 | -495. | 356. | 1 | 129 | 7775. | 77. | 2 | 126 | -2. | 360. | 1 | 128 | 8031. | 81. | 2 |
|  |  |  |  |  |  |  |  | 127 | 0. | 0. | 1 | 128 | 8031. | 81. | 2 |

-CONTINUATION OF 3D

| NUMBER OF SAMPLE | μLAW | DECIMAL VALUE | PHASE |
|---|---|---|---|
| 0 | 137 | 5727 | 45 |
| 1 | 134 | 6495 | 126 |
| 2 | 19 | -3615 | 207 |
| 3 | 1 | -7775 | 288 |
| 4 | 182 | 783 | 6 |
| 5 | 128 | 8031 | 87 |
| 6 | 171 | 1279 | 171 |
| 7 | 2 | -7519 | 252 |

*Fig. 6A*

| NUMBER OF SAMPLE | μLAW | DECIMAL VALUE | PHASE |
|---|---|---|---|
| 0 | 4 | -7007 | 299 |
| 1 | 154 | 2719 | 20 |
| 2 | 129 | 7775 | 101 |
| 3 | 54 | -783 | 186 |
| 4 | 0 | -8031 | 267 |
| 5 | 43 | -1279 | 351 |
| 6 | 130 | 7519 | 72 |
| 7 | 144 | 3999 | 150 |

*Fig. 6B*

MODEM COMPRESSION SYSTEM FOR TELEPHONE NETWORK

BACKGROUND OF THE INVENTION

This invention pertains to data communications systems, but more specifically to a data compression method and apparatus for use with telephone modems which transfer digital data over conventional public telephone lines utilizing standard digital processing.

Demands for interconnecting digital data terminals via telephone lines has spurred the development of modems. The advent of personal computers, telex and telefax machines and like digital devices (hereafter "data terminals") created this demand. Conventional modems (modulation-demodulation), such as the DPSK system described in U.S. Pat. No. 4,008,373 to Nash et al., convert digital output from the data terminal to a form suitable for analog telephone transmission, and then reconverts the telephone transmission at the receiving end back to a digital form suitable for use by the receiving data terminal. Thus each data terminal located at the respective transmitting and receiving ends of a communications link has an associated modem for transferring analog information with the telephone line.

It is known to provide systems for handling both analog voice and digital data transmissions in private branch exchanges, such as, for example, the switching system described in U.S. Pat. No. 4,578,789 to Middleton et al. There is also known a modem/voice data communications system which alternately routes analog voice and modem data over telephone lines in response to detection of some aspects of the transmitted data signals, such as described in U.S. Pat. Nos. 4,524,244 to Faggin et al., 4,660,218 to Hashimoto and 4,596,021 to Carter et al. However, no prior systems are known which operate in the conventional T1 environment and which achieve compression of modem data.

Telephone lines, however, being initially designed to cary relatively low-frequency human voice signals, do not efficiently transfer digital data bits between data terminals via modems. In most cases, data terminals are capable of handling high-speed bit transfer rates but bandwidth limitations of telephone lines, among other things, limit the bit transfer rate. Moreover, conventional T1 or like telephone networks do not include means for determining the type of originating data, e.g., whether from voice or data terminal, so its transmission technique does not "adapt" to a mode efficiently suited for the type of originating data.

Modems employ a variety of techniques for interfacing data terminals and telephone lines. Techniques such as tone encoding (acoustic couplers) and frequency shift keying (FSK) of a carrier tone are presently used to encode data terminal outputs. In one widely known technique known as the Federal Standard issued by the U.S. General Service Administration, unique dibit pairs emanating from the data terminal are encoded by unique phase changes between signalling elements (e.g., segments) of a low-frequency (1800 hz) sine wave. One Federal Standard specification, for example, provides for a 45° phase change between a contiguous pair of signalling elements to represent the dibit "00", 135° phase change to represent dibit "01", 225° phase change to represent dibit "11", and 315° phase change to represent dibit "10". It achieves bit rate transmission of 2400 bits/second at 1200 bauds. The phase change is defined as the actual phase shift in the transition region between successive signalling elements or bauds and, in this example, one baud equals one and one-half cycles of the tone carrier to attain transmission of 1200 bauds/second. Under a different CCITT standard, a V.27 protocol specifies 8-phase differential encoding characterized by phase changes of 0°, 45°, 90°, 135°, 180°, 225°, 270° and 315° between contiguous signalling elements of an 1800 hz tone carrier to represent respectively tribit values of "001", "000", "010", "011", "111", "110", "100", and "101" in order to achieve a 4800 bits/second bit rate. In this case, the 1800 Hz tone carrier is modulated at 1600 bauds/second to achieve 4800 bits/second transmission.

In each case, the receiving modem reconstructs the dibit pairs or tribit values by detecting respective phase shifts between signalling element. Modem modulation protocols provide various bit rates from 1200 to 9600 bits/second where the higher bit rates require smaller increments of phase encoding and detection. Of course, smaller incremental phase differentials necessarily involve more complex encoding and detecting techniques, and for the most part, an increased risk of data error. To correct probable errors, many modems utilize an error correction encoding and recovery techniques. Thus the actual bit rates in modem transfers incur some error detection and recovery overhead.

Because present telephone networks employ the well known T1 transmission protocols, substantial inefficiencies result when conveying digital data between data terminals. Under the T1 protocol, an analog voice signal at the transmitting end is sampled and converted to an 8-bit data byte (actually a 14-bit quantizing level which is then compressed under $\mu$law compression to 8 bits) using analog-to-digital converters. The sampling rate is 8 kHz, and at the receiving end, successive data bytes are reconverted to an analog signal by a reverse algorithm using digital-to-analog converters. The 1800 Hz modem tone carrier conveying information from the data terminal undergoes the same T1 processing in the telephone network. Thus, the use of modems in a T1 network subjects data terminal outputs to D/A conversion in the transmitting modem, A/D and a subsequent D/A conversion in the T1 telephone network, and yet another A/D conversion in the receiving modem.

Under the Federal Standard discussed above, each baud (e.g. a signalling element of 1.5 cycles) requires about 53.33 bits ((8000 hz/1800 hz) 1.5 cycles/dibit·8 bits/sample) to transfer one dibit pair over the T1 network, that is, 6.66 8-bit samples per signalling element. Under the 1600 baud CCITT standard, the T1 network produces five 8-bit samples per signalling element for a total transmission of forty bits to represent one tribit value. Substantial waste occurs because of the superfluous conversions and reconversions. According to the present invention, I provide modem compression by utilizing a tone carrier encoding technique particularly adapted to the T1 or like protocol to maximize bit rate transmission between data terminals. I also provide a means to detect the presence of modem data (e.g. tone carrier) in the T1 or like environment so that the telephone network may adaptively switch to its modem compression system, on call. At least one prior system described in U.S. Pat. No. 3,943,285 to Ragsdale et al. is known to achieve some bit savings in modem transmissions utilizing a modem multiplexing technique, but not within a T1 or like protocol.

Accordingly, it is a general objective of the present invention to provide means for increasing data transfer rates of data terminals utilizing modems for communicating through a telephone network utilizing T1 or like transmission protocols.

It is another objective to the present invention to provide means by which a T1 or like telephone network can adapt to a transmission mode best suited for the type of originating data, e.g., analog speech data or digital data from data terminal or computer.

In view of inefficiencies inherent in telephone networks in handling modem data in a T1 telephone transmission network, it is a more specific objective of the present invention to provide a modem data compression technique and apparatus for compressing modem data.

It is another specific objective of the present invention to provide a digital data compression method and apparatus particularly adapted for use with telephone transmission protocols which sample and digitize analog signals during the transmission of information.

In meeting the foregoing objectives, I was confronted with the problem of providing means to accomplish encoding and decoding, e.g., compression and decompression, within the time interval between receipt of 8-bit data samples transmitted over the T1 network and without delay. In the T1 system where typically twenty-four calls (thirty calls in Europe) are multiplexed over one telephone line, these 8-bit T1 data sample appear every 125 $\mu$seconds upon sampling the analog sine wave at 8 kHz. Backlogs in processing these data samples must be avoided to reduce required memory space which, if accumulating, renders the system impracticable.

SUMMARY OF THE INVENTION

In accordance with the present invention, a telephone line adaptor for use with T1 or like telephone networks having processing system for voice-like data includes a control system comprising a first detection means for detecting whether originating information consists of voice-like or modem data, modem compression means responsive to the detection means for packing and transferring digital modem bits into T1 transmission packets, bypass means for enabling voice-like data to bypass said modem compression means and for routing the same to speech data processing system. At the receiving end of the telephone network, I provide second detection means for receiving modem and voice-like data, modem decompression means responsive to the second detection means for decompressing compressed modem data, second bypass means responsive to the detecting means for enabling voice-like data to bypass the modem decompression means and enter said speech data processing network thereby to complete the communication link between transmitting and receiving ends for either voice-like or modem data from a data terminal.

Preferably, the transmitting and receiving ends of the telephone network have duplicate functions to transmit and receiving either voice-like or digital modem data in both directions to attain full-duplex operation.

Other aspects, features, and advantages of the invention will become apparent upon review of the succeeding disclosure taken in connection with the accompanying drawings. The invention though is pointed out with particularity by the appended claims.

BRIEF DESCRIPTION OF THE DRAWINGS

FIG. 1D, is a detailed block diagram of the voice/modem detector circuit of FIG. 1A.

FIGS. 3A through 3D are look-up tables contained in ROM of FIG. 1B used for deriving angular information from sampled modem waveforms used for determining phase changes between digitized representations of signalling elements in accordance with the present invention.

DESCRIPTION OF ILLUSTRATIVE EMBODIMENTS

Figure 1A:
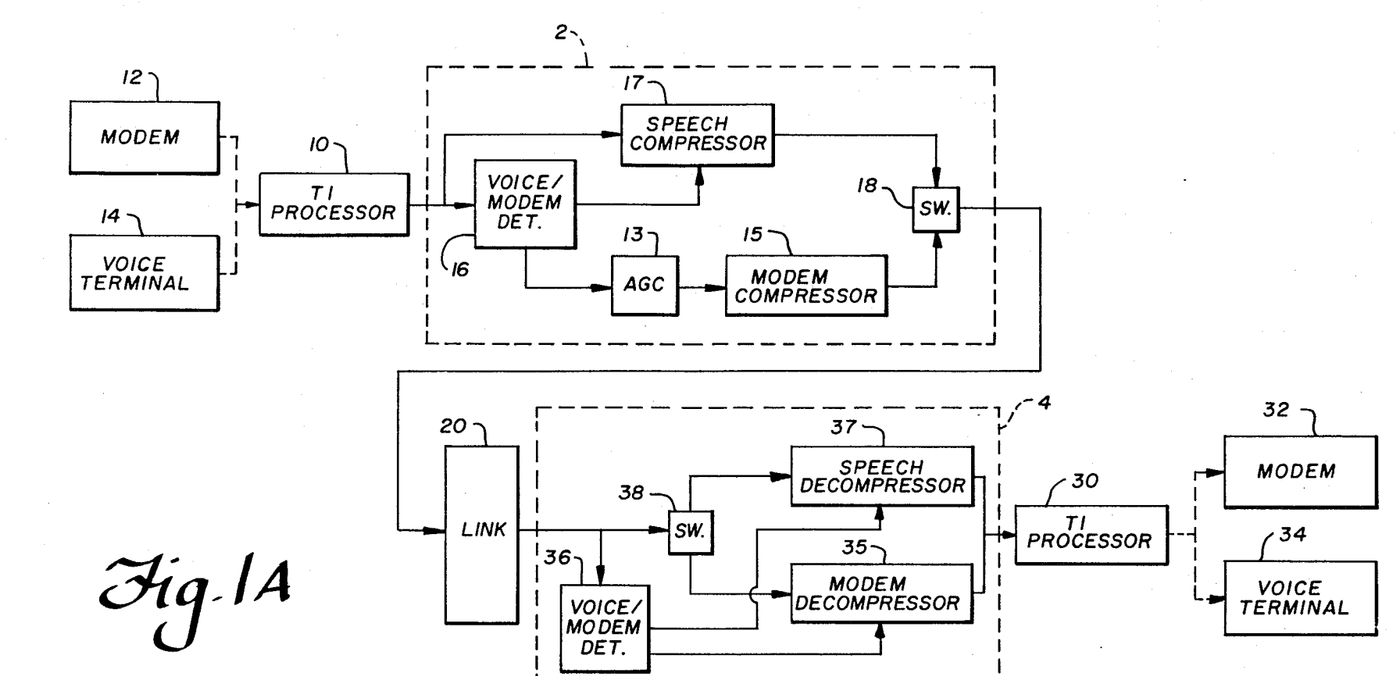
FIG. 1A depicts a functional block diagram of a telephone communications network incorporating a preferred embodiment of the present invention.

FIG. 1 shows the transmitting and receiving ends of a telephone network including the preferred modem compression system and a conventional speech compression system. To achieve compatibility with existing T1 networks, at the transmitting end of the network I interpose a "black box" 2 between a T1 processor 10 and the transmission link 20. Black box 2 receives and transmits T1 data samples according to the conventional T1 protocol. At a distant receiving end, I interpose a "black box" 4 between the transmission link 20 and a distant T1 processor 30. Black box 4 also receives and transmits conventional T1 data samples according to the conventional T1 protocol. Box 2 includes both speech and modem data compressors, while box 4 includes both speech and modem data decompressors. They may be implemented by hardware, firmware or software systems. At each end of the telephone network, the respective T1 processors communicate with modem and/or voice terminals according to the conventional T1 protocol. Advantageously, no modifications need be made to conventional T1 telephone networks to utilize modem and speech compression according to the present invention.

I describe a half-duplex system, it being understood that in actual practice, two-way full-duplex communication is achieved by duplicating functions of black boxes 2 and 4 at both the transmitting and receiving ends.

In the preferred structure, the transmitting end of the network includes a modem 12, voice terminal 14, T1 processor 10, automatic gain control (AGC) circuit 1, voice/modem detector 16, a conventional speech data compressor 17, modem compressor 15 and a switch 18 for routing either compressed modem or voice data to a distant receiving end of the telephone link 20. A data terminal, not shown, connects to the modem 12. The voice terminal 14 may, for exaple, comprise a telephone handset. The phantom connection between the modem and voice terminal to the T1 processor indicates user selection of these devices. Voice terminal 14 transmits analog speech signals typically in a range between zero and 4 kHz. Modem 12 typically emits an 1800 kHz tone carrier, e.g., a sine wave, within the same frequency range of analog speech signals. The tone carrier is modulated to carry digital information.

The receiving end of the network includes a similar voice/modem detector 36, switch 38 for routing received data to either a speech data decompressor 37 or a modem data decompressor 35, a T1 processor 30 for reconverting digital data back to an analog form for use by either the receiving modem 32 or receiving voice terminal 34, as the case may be. The speech decompressor 37, modem decompressor 35, and T1 processor 30 perform reverse algorithms relative to corresponding units located at the transmitting end. The modems 12 and 32, terminals 14 and 34, T' processors 10 and 30, AGC circuit 13, speech compressor 17 and speech decompressor 37 are conventional devices which are commercially available. As an example of a speech compressor 17 and a decompressor 37 for compressing digitized speech data, reference is made to my copending U.S. application Ser. No. 116,534 filed Nov. 4, 1987 titled "Bit Saving Technique for Voice Data Transmission"; my copending U.S. application Ser. No. 888,453 filed June 6, 1987 titled Data Compression System Using Frequency Band Translation and Intermediate Sample Extrapolation; and U.S. Pat. No. 4,066,844 to Ridings, Jr. et al.

The T1 processor 10, as known in the art, samples incoming analog signals from the transmitting modem 12 and/or voice terminal 14 at an 8 kHz sampling rate to produce 14-bit digital data samples. The 14-bit samples are compressed to 8-bit bytes by $\mu$law logarithmic compression which reduces the dynamic range of the samples. The digital samples are then multiplexed and transmitted through the telephone network.

According to an aspect of the invention, the network transfers both modem and voice data digital but processes them differently to achieve maximum available data throughput. To enable modem compression, and AGC circuit 13 normalizes the levels of the T1 data samples from processor 10 and supplies the normalized values to modem compressor 15. Due to signal drift, normalization is required to reduce error in predicting the next sampled sine wave value, for comparison purposes, from a current value using the look-up tables (FIGS. 3A-3D), as more fully explained below. Only a selected one of compressors 17 and 15 is activated to compress data. Selection is performed by voice/modem detector 16 which "looks" for the characteristic periodic answering tone carrier of the modem.

Tone carrier detection in detector 16 can be attained by testing periodic ones of the data samples from the T1 line for equality (within a certain tolerance). For example, an answering tone carrier can be confirmed by examining samples for equality at a 2100 Hz $\pm$100 Hz rate since this is the typical modem answering tone signal. By way of illustration, every eighth sample of a 1000 Hz sine wave is equal at an 8000 Hz sampling rate. With a 2100 Hz sine wave, every 3.81th sample is equal at an 8000 Hz sampling rate. In actual practice, the systems tests for equality for a few hundred to a thousand sample points to confirm detection of modem data. No such equality is likely to persist for human speech data. Thus voice/modem detector 16 includes a circuit for detecting such equality for a predetermined duration consonant with the modem protocol in order for determining whether modem or voice data exists on the line.

At the receiving end, modem retransmissions back to the transmitting end occur at 2400 Hz in a full-duplex system in order to complete the "hand-shake". Likewise, a similar modem/voice detector at the receiving end "looks" for the 2400 Hz modem retransmissions in a full duplex system.

In an alternative embodiment of detector 16, normalization need not be performed at all. Instead, the look-up tables contain ratio information tied with angular data which finds its basis in the fact that the ratio of levels of periodic samples of a sine wave remain constant despite signal drift, assuming that drift occurs slowly relative to cycle periodicity. In this case, normalization is somewhat built-in the tables.

Going forward with describing the system operation, upon detection of a modem answering tone, detector 16 activates modem compressor 15. In the absence of tone carrier detection, detector 16 activates speech compressor 17. Each of these compressors is uniquely suited to compress either one of speech or modem data. Switch 18 also responds to detector 16 to couple the appropriate path from a selected one of the compressors 15 and 17 to the conventional transmission link 20.

At the receiving end, a similar switch 38 responsive to a similar detector 36 alternatively routes data to and activates one of the speech and modem decompressors 37 and 35. Speech decompressor 37 decodes human speech information which was encoded by the speech compressor 17 at the transmitting end, whereas modem decompressor 35 decodes modem bit transmissions encoded by modem compressor 15 at the transmitting end. Thereafter, the selected decompressor supplies digital data to T1 processor 30 for reconversion to analog data as conventionally performed.

Figure 6A:
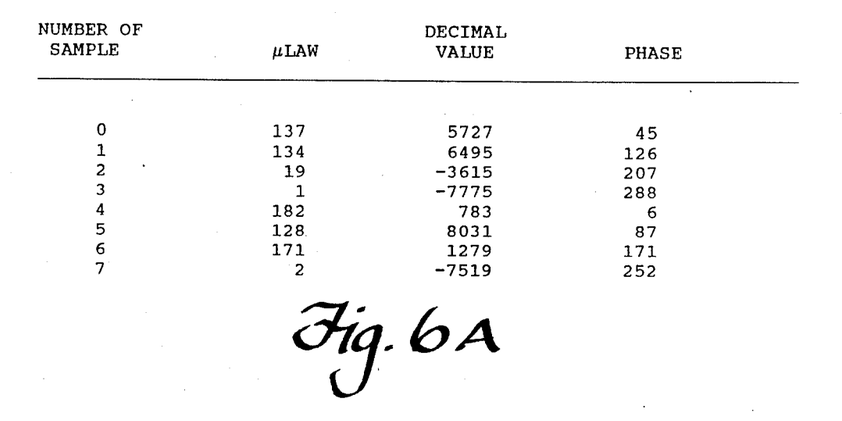
FIGS. 6A and 6B shown modem decompression tables used for reconstructing sets of sample points of respective sampling elements representing exemplary tribit values.
Figure 6B:
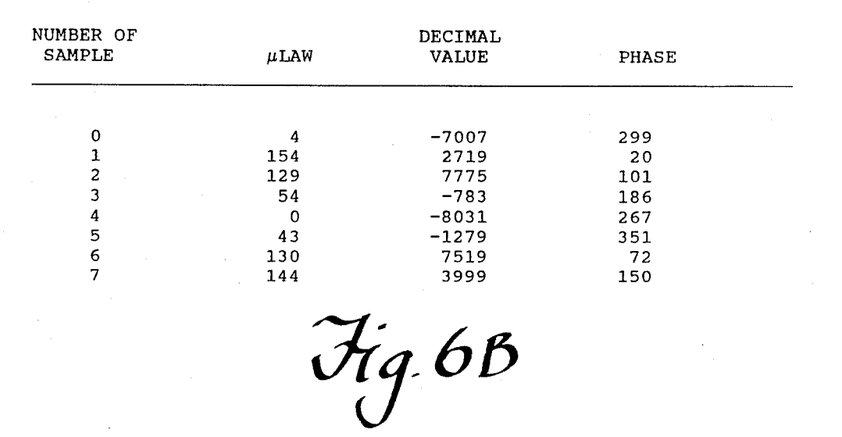

Assuming modem data bit transmissions at 1200 bauds over an 1800 Hz sine wave carrier, decompressor 35 converts each dibit (or tribit) to a given set of 6.66 8-bit samples, using another set of look-up tables (FIGS. 6A and 6B). Since, by definition of the modulation technique under the Federal Standard, phase changes occur only at four fixed angular points in the carrier sine wave, it follows that decompressor 35 requires a total of sixteen such look-up tables for reconstructing the 8-bit data samples of each signalling element. The sixteen tables represent sixteen unique combinations of phase changes between past and current signalling elements. By testing for the presence of one of the conditions, modem decompressor 35 reconstructs the proper set of 8-bit bytes representing the signalling element. From these bytes, T1 processor 30 reconstructs the proper analog signal for the receiving modem. Under the CCITT Standard, however, sixty-four such tables are required since each signalling element represents one of eight, rather than four, bit patterns. Accordingly, by use of this approach, I achieve a compression system which adapts to either speech or modem data transmissions to maximize utilization of T1 telephone networks carrying both types of data.

Figure 2:
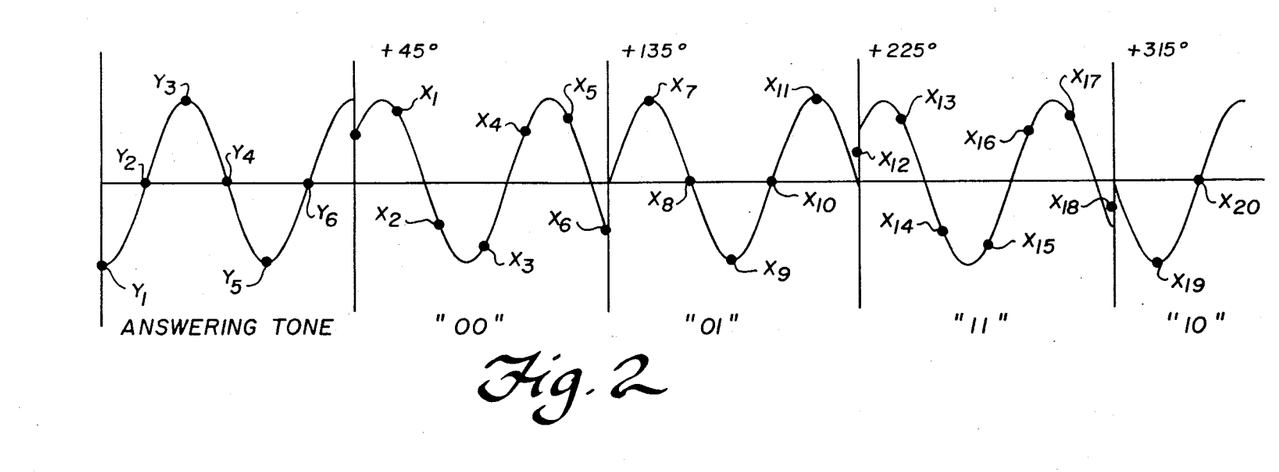
FIG. 2, is a typical modem waveform useful for explaining differential phase shift encoding in conjunction with bit pattern translations carried out by the modem compression scheme of the present invention.
Figure 4:
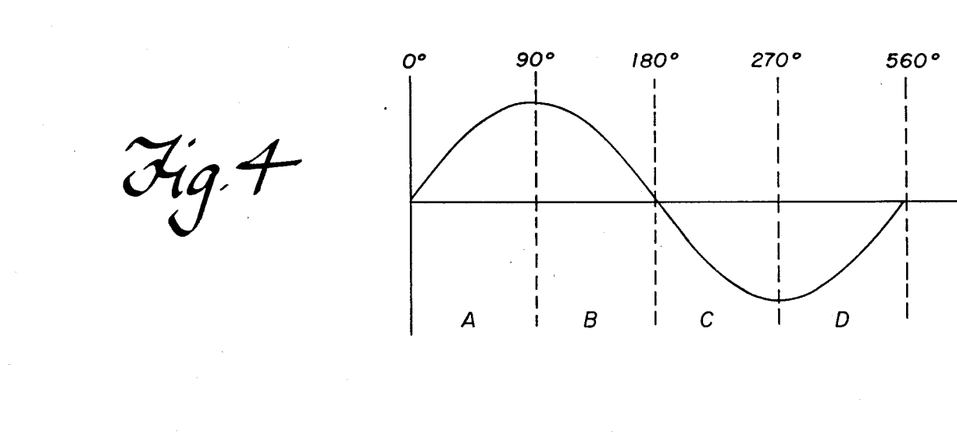
FIG. 4 is a sine waveform illustrating derivation of the table contents of FIGS. 3A-3D.

In describing a preferred modem compressor 15 and modem decompressor 35, I refer to a typical differential encoding scheme of FIG. 2 used by a typical modem.

Upon an initial communication request by a data terminal, the transmitting and receiving modems undergo synchronizing and initialization sequences in which signals are intercommunicated to establish a "hand shake". Modem 12 emits a 2100 Hz answering tone as indicated in the initial portion of the waveform shown in FIG. 2. The receiving modem 32 responds at 2400 Hz to complete the hand shake. The T1 network 10 samples the answering tone and generates periodic 8-bit initialization data samples y1, y2, y2, . . . yn.

To detect the presence of the modem answering tone, detector 16 tests the samples y1, y2, y2, . . . yn for periodicity. It implements a periodicity test by searching for a fixed number of sign changes expected in a predetermined time interval of a 2100 Hz signal. The 2100 Hz tone signal can be distinguished from speech data since the latter is not likely to have the same fixed number of expected sign changes within the same predetermined time interval. As detailed in FIG. 1D, detector 16 includes an AND gate 161 which tests the sign bit of incoming T1 data samples from T1 processor 10 (FIG. 1A). Upon transfer of each data sample, gate 161 transfers a first value representing a "zero" sign bit, or a second value representing a "one" sign bit, to circular buffer 163. Buffer 163 sequentially stores the results of each sign comparison between consecutive data samples. Comparator 165, which receives a current data sample sign bit at one input and a past data sample sign bit at its other input, performs the comparison and transfers the results thereof back to the buffer 163. Counter 167 keeps a count of the number of sign changes stored in circular buffer memory 163. When the count reaches a fixed value stored in register 162, comparator 166 indexes a second counter 169. Counter 169 counts the number of repetitions of attaining the given number of sign changes detected by counter 167. When counter 169 reaches a preset value stored in register 164, it effects activation of either the speech compressor 17 or the path of AGC/modem compressor 13 and 15. Comparator 168 makes this latter comparison, and emits an appropriate signal via its output or through inverter 160.

Buffer memory 163 preferably contains thirty-two storage positions, each representing the sign change status between consecutive successive data amples. With thirty-two positions in memory 163 (representing a time interval of about four milliseconds) and an eight kilohertz sample rate, a fixed number of about seventeen sign changes are expected in a 2100 Hz sine wave signal. Counter 169 is indexed each time counter 163 reaches the fixed number at the end of each thirty-two samples. When counter 169 reaches a second fixed value, say one-thousand sixty-four representing about four seconds in duration, it indicates passage of modem data and trips AGC/modem compressor 15. Other values may be used depending upon the desired duration of the predetermined time interval.

Assuming detector 16 detected modem data, 8-bit modem data samples x1, x2, x3 . . . xn (FIG. 2) representing the actual modem data bits are conveyed over the 1800 Hz tone carrier to AGC circuit 13 and modem compressor 15. In this example shown in FIG. 2, four dibit pairs representing the sequenc "00011110" are illustrated. AGC circuit 13 normalizes the magnitude of the samples to establish a constant reference level against which each sample is examined by modem compressor 15. The respective values of the samples differ according to the beginning point in the sine wave of each signalling element and by the amount of phase change experienced between signalling elements. The beginning point is pseudorandom, but once known, the remaining points in the signalling elements are predictable since samples are taken at an 8 kHz rate.

Figure 1B:
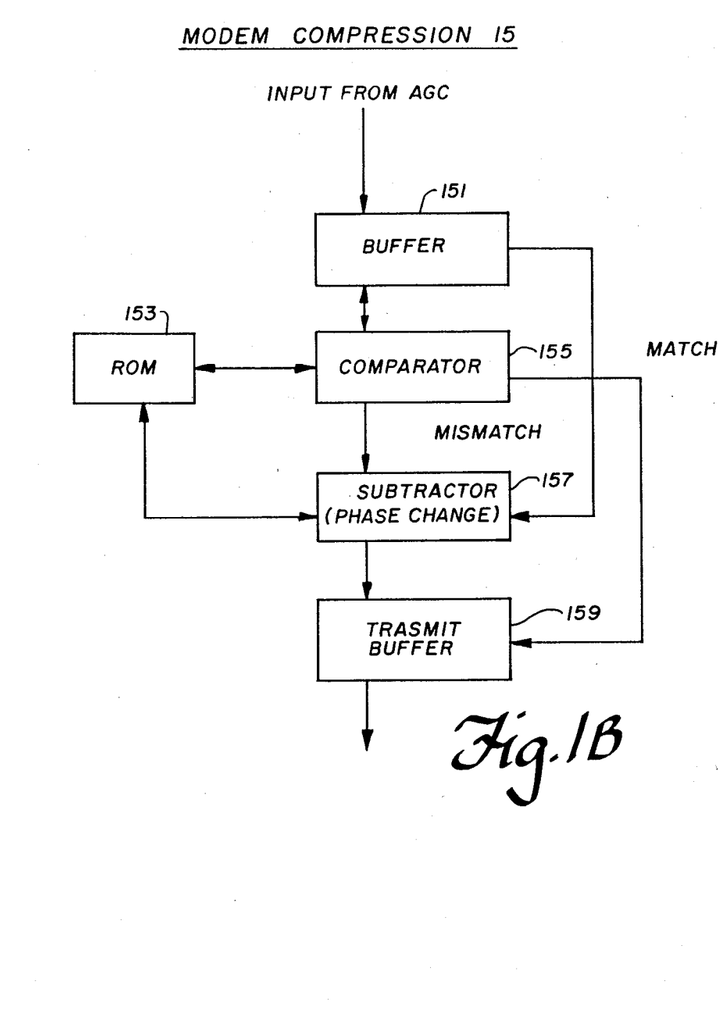
FIG. 1B is a detailed block diagram of the modem compressor of FIG. 1A.

FIG. 1B shows the modem compressor 15 of FIG. 1A. Compressor 15 comprises an input buffer 151 which receives normalized sample values from the AGC circuit 13, a comparator 155 for comparing current samples with predicted samples, ROM table 153 for storing information by which to make the comparison, a phase change calculation circuit 157 for calculating a phase change after mismatch detection by comparator 155, and an output buffer 159 for assembling and transmitting encoded dibit (or tribit) values in data bytes according to the T1 protocol.

Due to symmetry of levels in the first and second half-cycles of the sine wave, each normalize sample emitted by the modem 12 has one of two unique angular values associated with it. The correct angular association is easily resolved since only one of the two unique angular values is in accord with the defined phase changes of the encoding technique. If a phase change occurs between two samples, e.g., indicative of a new signalling element from modem 12, a mismatch occurs between the predicted and current samples. Such mismatch signals a new signalling element and invokes a routine to determine the associated bit pattern. The actual phase changes is determined by the amount of such mismatch.

Modem compressor 15 determines phase changes between signalling elements by accessing look-up tables as depicted, for example, in FIGS. 3A through 3D, upon receipt of each data sample from modem 12. The contents of the look-up tables are stored in the ROM 153. The tables show relative values for 512 discrete points of magnitude of a sine wave that are encountered in 8-bit $\mu$law compressed samples transferred over the T1 network. Of course, the table is designed to match the characteristics of the transferred data samples. So if other than $\mu$law compressed samples are transferred, the table entries will differ accordingly. Each entry in the ROM table contains two sets of information—a first including a representation of the normalized value of a current sine wave sample and its associated phase angle, and a second including the next predicted normalized sine wave value and its associated phase angle assuming no change in signalling element.

Regarding the first set of information about the current sample, the entry in column "A" of the tables indicates $\mu$law value, column "B" indicates the corresponding decimal value, column "C" indicates the associated phase angle and column "D" is a table number reference. The second set of information in columns "E" through "H" identify like parameters of the next predicted sample relative to the entry in columns "A" through "D" assuming no change in signalling element. Column "E" indicates the next predicted $\mu$law value, column "F" indicates the decimal value thereof, column "G" indicates the phase angle of the next predicted sample, and column "H" identifies the table number where the next entry is found. Of course, rather than comprising magnitude/angular information, the tables can comprise ratio/angular information, as previously indicated.

Using these ROM tables 153 (FIG. 1B) to detect a phase change upon receipt of a data sample, modem compressor 15 stores a table entry in buffer 151 the contents of a sample "n". The entry includes the current phase angle. Upon receipt of sample n+1, comparator 155 examines the amplitude and checks to determine whether this amplitude matches the predicted value for sample "n" stored in buffer 151. If affirmative, it replaces the buffer contents with the table entry in ROM 153 associated with sample n+1, together with the predicted parameters of sample n+1. This process is repeated until a mismatch occurs. On the other hand, if a mismatch occurs between the parameters of nth and (n+1)th sample (e.g. a phase change boundary), phase change circuit 157 calculates the phase change. To do so, it accesses the ROM look-up table 153 to determine the phase angle associated with the amplitudes of the nth and (n+1)th samples. Thereafter, it computes the phase change on the basis of the phase angle difference between them. Due to symmetry, any ambiguity is resolved upon receipt of the next sample point since it is known that we have passed a phase boundary and the next sample is spaced therefrom by 81° (At an 8 kHz sample rate of an 1800 Hz sine wave, samples are spaced 81° apart). At the second sample point after the mismatch occurred, the exact amount of phase is determined.

Once identifying the proper phase change, circuit 157 assembles in an output buffer 159, the proper bit pattern (dibit or tribit value) associated with the phase change according to the modem encoding technique. When the buffer 159 accumulates eight bits, a T1 data byte is assembled and transmitted to the receiving end over link 20 or multiplexed with other data, as the case may be in conventional T1 processing. Modem compressor 15 also embeds signalling bits within the modem data bit stream useful for the modem decompressor 35 and/or detector 36 for controlling their operation.

Figure 1C:
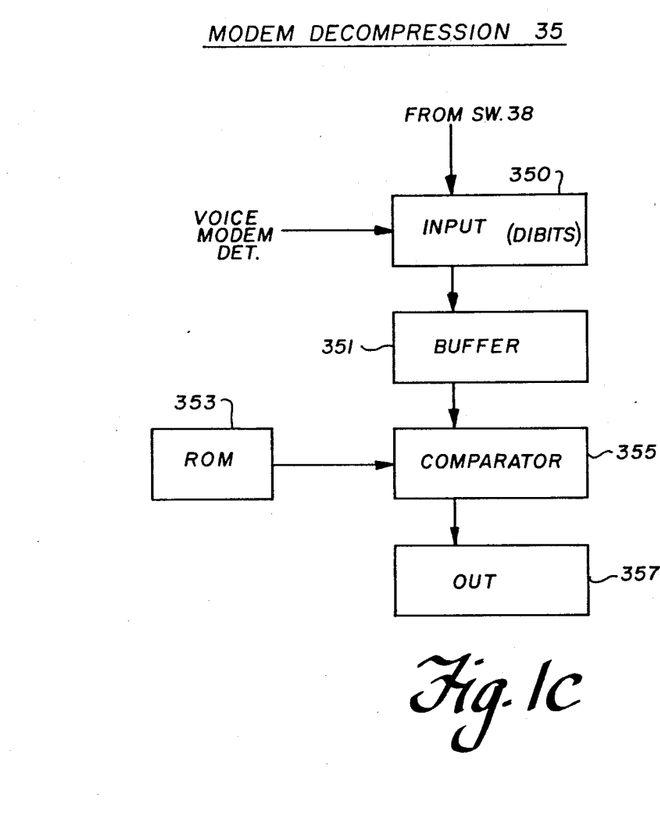
FIG. 1C is a detailed block diagram of the modem decompressor of FIG. 1A.

At the receiving end, voice/modem detector 36 extracts embedded signalling bits from the compressed modem data bit stream in order to activate either the modem decompressor 35 or speech decompressor 37. If human speech data is being transmitted, switch 38 routes the data bytes to the T1 processor via the speech decompressor 37. On the other hand, if detector 36 is directed by the embedded signalling bits to handle modem data bytes, input buffer 350 (FIG. 1C) of the modem decompressor 35 is activated to receive incoming data bytes, separate them into dibit (or tribit) values, and store them in buffer 351 (FIG. 1C). As explained below, a full set of data samples for each signalling element is reconstructed from each dibit (or tribit) value. These 8-bit data samples are assembled in the output buffer 357 and transmitted to T1 processor 30 representing successive signalling elements having the proper amount of phase change between them.

Figure 6C:
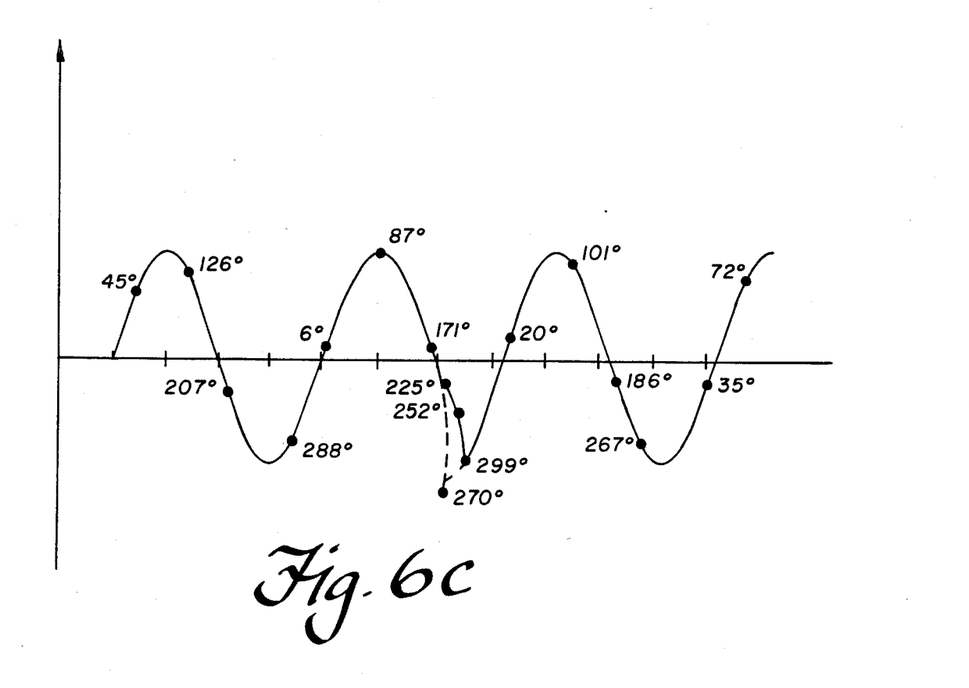
FIG. 6C is a waveform reconstructed from the data sets of the tables of FIGS. 6A and 6B.
Figure 10:
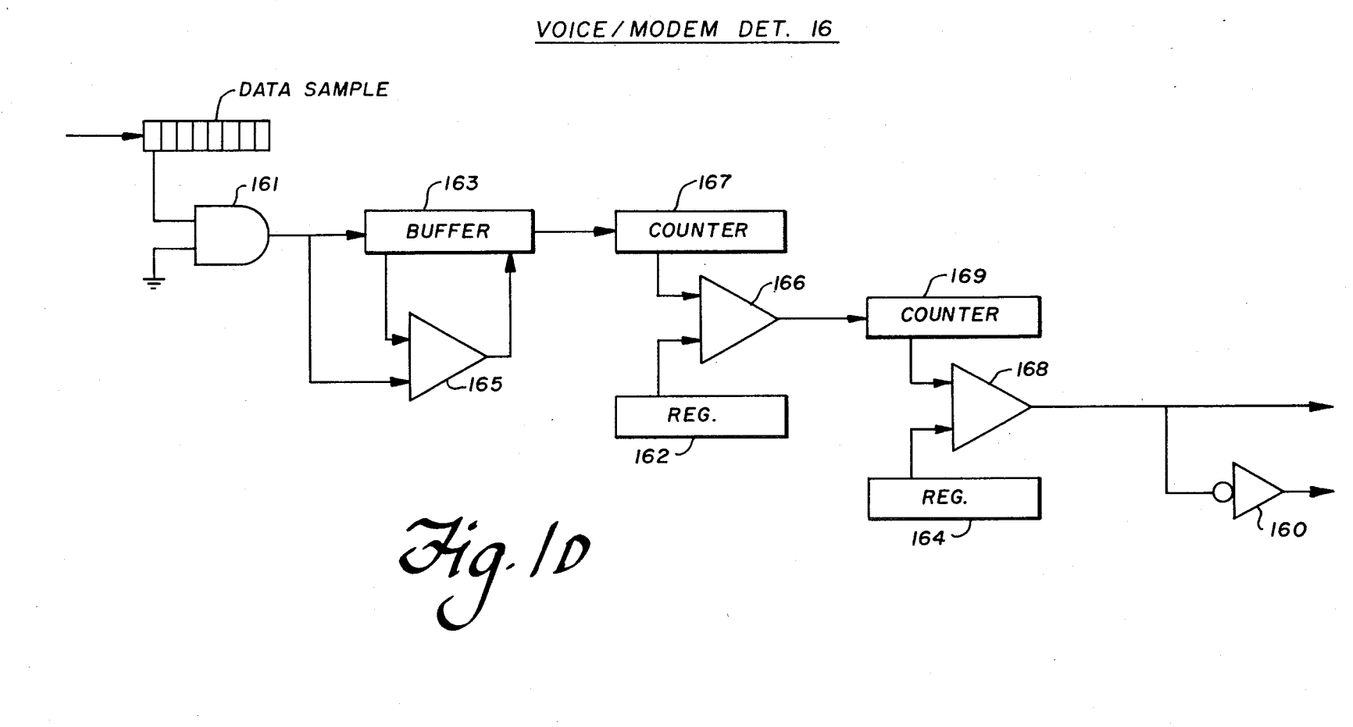

Reconstruction is performed by another set of look-up tables illustrated in FIGS. 6A and 6B. Only two of sixty-four of such tables are shown for exemplary combinations of successives of tribit values. Table 6A shows the set of 8-bit sample points generated by decompressor 35 when tribit value "000" follows the tribit value "001". It should be noted, however, that the last entry number seven in table 6A may not be assembled in the output buffer 357 since only 6.66 8-bit data samples are contained in the signalling element. Table of FIG. 6B shows an exemplary next set of 8-bit sample points assuming the tribit value "001" appears again after the previous value "001". FIG. 6C depicts the analog waveform reconstructed by the sample points of FIGS. 6A and 6B.

The respective sets of data samples representing the decoded or expanded dibits are then supplied to T1 processor 30 which reconverts the resulting digital data stream to an analog signal for use by the receiving modem 32.

By way of example, I now go through an exercise of detecting a phase change in a V.27 specified differential phase shift encoding. I assume the modems are communicating under the V.27 CCITT standard which assigns tribit values according to the following table:

| Tribit Value | Phase Angle |
| --- | --- |
| 001 | 0° |
| 000 | 45° |
| 010 | 90° |
| 011 | 135° |
| 111 | 180° |
| 110 | 225° |
| 100 | 270° |
| 101 | 315° |

Figure 5:
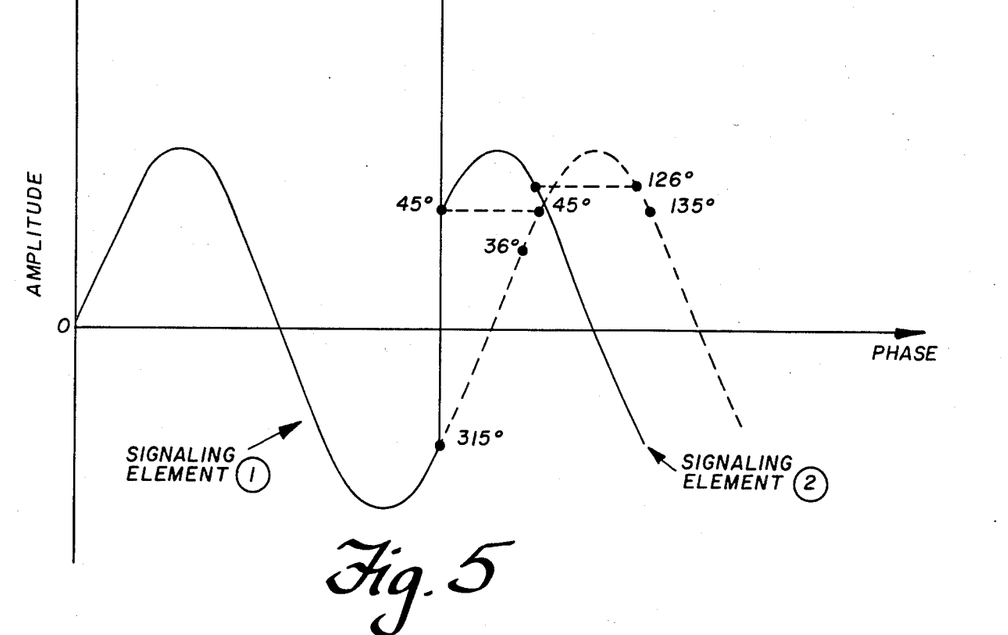
FIG. 5 illustrates a method for determining a phase change utilizing sample points on a waveform.

Referring to FIG. 5, suppose for example the past sample n stored in the buffer of decompressor 15 is μlaw value 9 (decimal −5727) (FIG. 3D) having associated phase angle of 315°, and that the current detected sample n+1 is μlaw value 137 (decimal +5727). At 8000 Hz sampling, sample points are spaced 81° apart on an 1800 Hz sine wave. Thus, the next sample n+1, based on sample n=μlaw 9, is expected to be 396° (e.g., 36°) [315°+81°]. Value 137 has two entries in the tables, one in FIG. 3A having phase angle 45° and another in FIG. 3B having phase angle 135°. In calculating the phase change for both table entries, compressor 15 produces results of 90° phase shift in the first instance and 135° phase shift in the second instance.

The second table entry is ignored since the next sample point has a table entry of 134 (phase angle of 126°) which indicates that the ambiguity of the phase change of 90° or 135° is ascertained as 90°. The future sample amplitude and phase on the signalling element cannot be less than 81° relative to a previous sample. Since by definition, the second phase change has no meaning, it is determined that a 90° phase change occurred which represents the tribit value "010". At the receiving end, modem decompressor 35 receives the bit pattern "010" as the appropriate bits and reproduces the associated set of data samples based upon the previous signalling element.

To detect the bit sequence "001" with zero degree phase change, compressor 15 keeps track of time intervals of the signalling elements, and expects a phase change at certain points. If no phase change occurs when expected, compressor 15 interprets this condition as the bit sequence "001".

The foregoing illustrates a preferred method and apparatus for carrying out the invention, and is by no means limiting of the scope. Many modifications, such as those suggested herein, can be made without departing from the scope of the invention. Accordingly, it is my intent to embrace all such modifications and adaptations as may come known to those skilled in the art based upon the above teachings.

What is desired to be secured by U.S. Letters Patent is claimed as follows:

1. A telephone communication network including means for alternately routing analog modem and voice-like information through an analog path and a modem path, said network including analog-to-digital converting means for producing digital data samples representing an analog information signal originating at a transmitting end and digital-to-analog converting means for producing an analog representation of said digital data samples at a receiving end, said network further comprising:
  A. speech path means (17, 37) for passing data samples representing said voice-like information through said network;
  B. modem path means (15, 35) for passing data samples representing said modem information through said network;
  C. detector means (16) responsive to said data samples for alternately routing said modem data and said voice-like data through one of said speech and modem path means.

2. A telephone communications network as recited in claim 1 further include automatic gain control means (13) interposed between said detector means and said modem path means.

3. A telephone communications network as recited in claim 2 wherein said speech path means includes speech compression means disposed at the transmitting end and speech decompression means disposed at the receiving end; and said modem path included modem compression means disposed at the transmitting end and modem decompression disposed at the receiving end.

4. A telephone communications network as recited in claim 3 wherein said modem decompression means comprises processing means for detecting phase changes among signalling elements according to discrete data samples representing modem information.

5. A telephone communications network as recited in claim 4 wherein said processing means of the modem decompression means includes
  i. look-up table means which includes a plurality of entries of amplitude and associated phase parameters of a modem carrier signal, and predicted amplitude and associated phase parameters of a next succeeding sample based upon a tone carrier sampled at a given rate of said analog-to-digital converting means, and
  ii. phase change computation means for computing phase changes between signalling elements according to the entries in said table look-up means.

6. A telephone communications system as recited in claim 5 wherein said processing means further includes means for detecting an initialization sequence of a modem communication.

7. A modem compression system for use in a telephone communications network which includes analog-to-digital converting means at a transmitting end for sampling an information signal to produce digital data samples thereof, and digital-to-analog converting means at a receiving end for reproducing an analog representation of said information signal, wherein
  A. the transmitting end comprises:
    i. first receiving means located for receiving said digital data samples,
    ii. first detecting means for detecting the presence of modem data in said information signal,
    iii. compression means for extracting and assembling modem data bits from sampled signalling elements of said modem information signal,
    iv. transmitting means for transmitting the assembled modem data bits to the receiving end of the telephone network, and
  B. wherein the receiving end comprises:
    i. second receiving means for receiving the assembled transmitted modem data bits, and
    ii. decompression means for reproducing modem signalling element from said transmitted modem data bits thereby to produce a modem signal adapted for use by the receiving modem, said decompression means including means for segmenting the assembled modem data bits and for reconstructing a full set of data samples representative of said signalling element.

8. A modem compression system as recited in claim 7 wherein said first receiving means include AGC means for normalizing the value of data samples.

9. A modem compression system as recited in claim 8 wherein said decompression means includes table look-up means which correlates magnitude and phase paameters of successive sample points of a modem carrier signal and means accessing said look-up means for determining phase changes between signalling elements of said modem carrier signal.

10. A modem compression system as recited in claim 9 further including means for detecting modem initialization sequences.

* * * * *